United States Patent [19]
Kolinger et al.

[11] 3,990,738
[45] Nov. 9, 1976

[54] ISOLATED, OFFSET TRACTOR PLATFORM

[75] Inventors: Kenneth J. Kolinger, Riverside; Henry Niemczyk, Roselle, both of Ill.

[73] Assignee: International Harvester Company, Chicago, Ill.

[22] Filed: Oct. 24, 1975

[21] Appl. No.: 625,446

[52] U.S. Cl. .............................. 296/35 R; 280/756; 296/102
[51] Int. Cl.² ........................................ B62D 23/00
[58] Field of Search .................. 180/89 R; 280/756; 296/28 C, 35 R, 102

[56] References Cited
UNITED STATES PATENTS

| | | | |
|---|---|---|---|
| 3,438,672 | 4/1969 | Gipp | 180/89 R X |
| 3,797,598 | 3/1974 | Warner | 180/87 R X |
| 3,834,754 | 9/1974 | Zajichek | 280/756 X |
| 3,866,942 | 2/1975 | Dobeus | 296/102 X |
| 3,917,310 | 11/1975 | Mitsuishi | 280/256 |

Primary Examiner—M. H. Wood, Jr.
Assistant Examiner—Gene A. Church
Attorney, Agent, or Firm—John W. Gaines; Floyd B. Harman

[57] ABSTRACT

An offset platform, mounted on isolation mountings on a tractor having cross beams carried on the chassis for pivotally and yieldably supporting the platform on its mountings. The mountings serve not only as described for the platform, but provide also an isolation mounting, conjointly, to any and all tractor superstructure included on the platform such as an operator's cab, seat assembly, and rollover protective frame structure.

19 Claims, 5 Drawing Figures

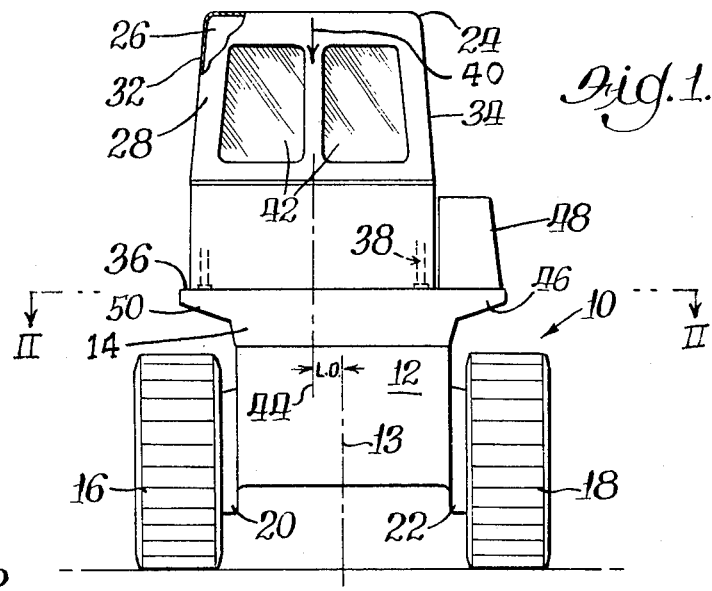
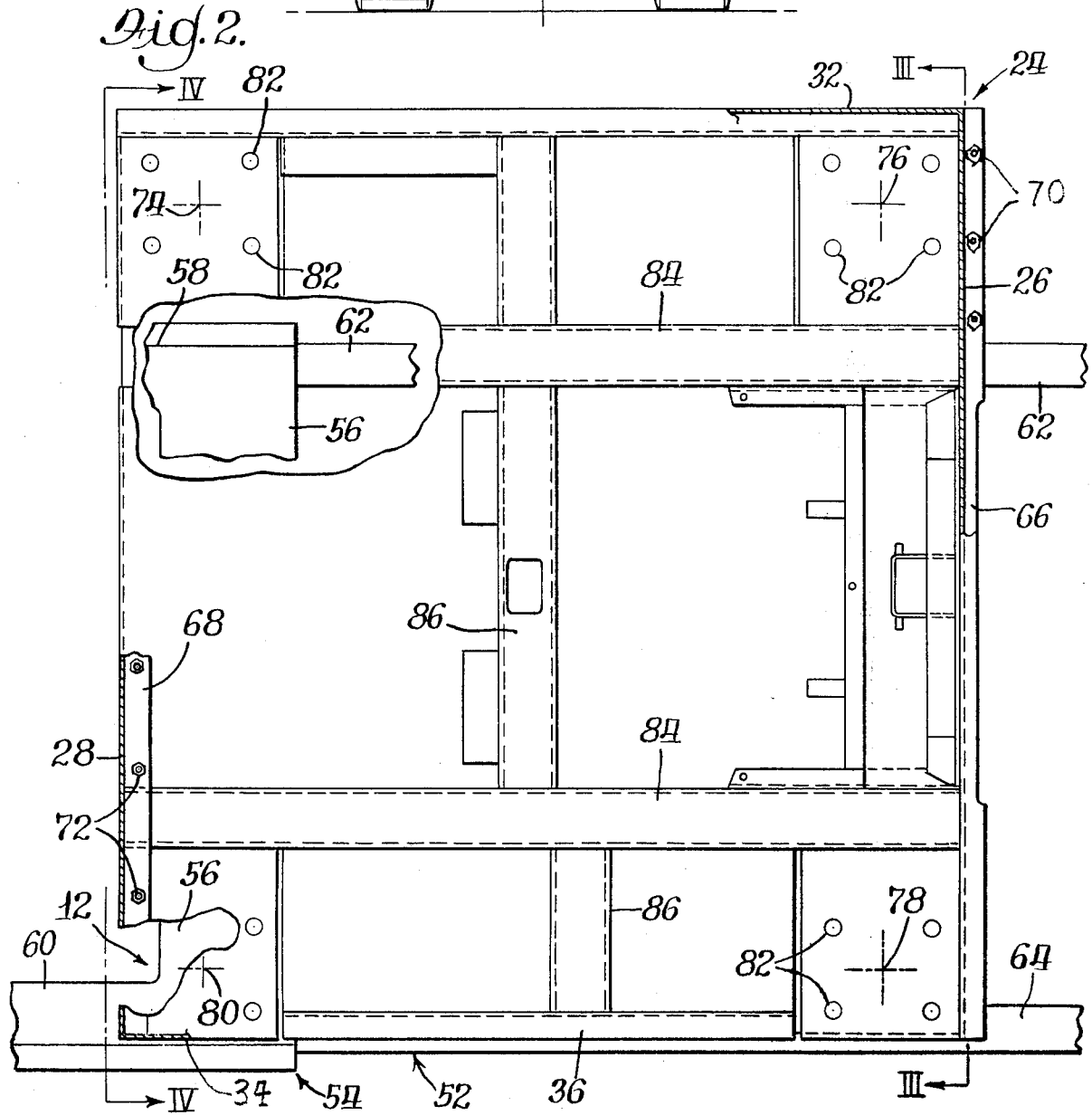

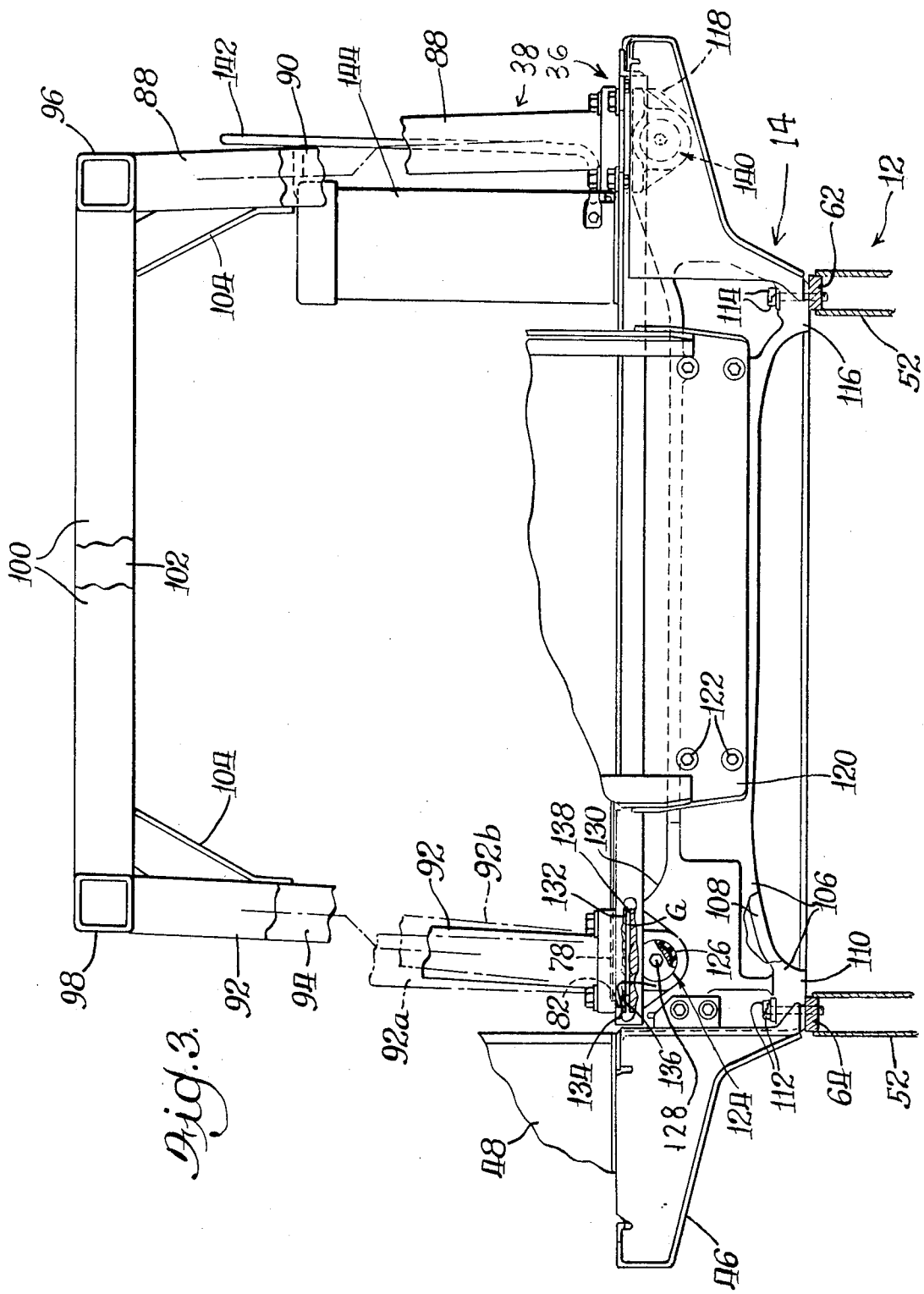

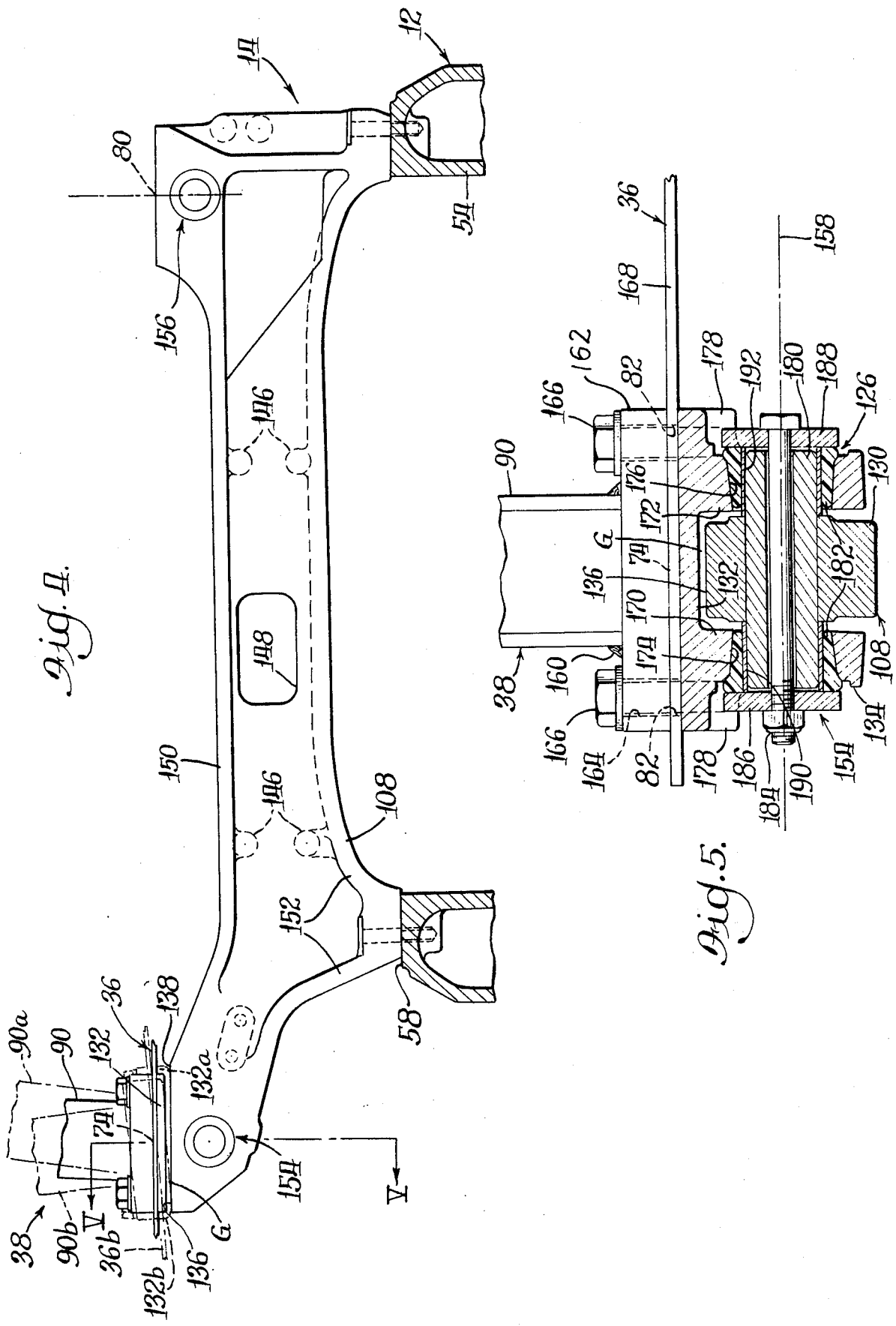

ISOLATED, OFFSET TRACTOR PLATFORM

The present invention relates generally to an isolation mounted, offset platform on the chassis of a tractor, and more particularly to a means to offset-mount a tractor platform having platform support castings which are pivotally and yieldably supported on chassis cross beams by means of detachable isolation mountings.

With the advent of solidly protected, acoustic cubicles for the operator on modern tractors, particularly on crawlers, the need for a pivotally and yieldably mounted platform assembly at the operator's station is becoming apparent if not essential, and the ready detachability thereof, if provided for in the design, can afford considerable practical importance to the design. Thus in instances where the mounting of a rollover protective structure (ROPS), seat assembly, and/or tractor cab is contemplated on the platform assembly, the design can afford an ease of assembly to be accomplished, a pre-assembly technique to be accomplished, the accomplishment of having the rest of the assembly remain intact when independently removing the ROPS, or when independently removing the cab, or when independently removing the seat assembly, and the accomplishment of removing the platform assembly including the support castings thereof, or just the platform without the support castings included in the platform assembly. Our invention makes a significant advance toward the accomplishment of the foregoing.

Obviously, removal of the platform alone or of the platform assembly, all with any attendant superstructure thereon, will clear the portion of the tractor at the operator's station to facilitate any repair or replacement of the tractor transmission generally occupying the area therebelow of the chassis frame which supports the platform assembly and its support castings and cross beams on the tractor.

Objects and advantages will be apparent when it is considered in our invention that: cross beams supportive of the isolation mountings and ROPS thereon are cast with a deep cross section, enabling any ground impact force into the ROPS to be reacted into and to be grounded out in the beams when the tractor overturns onto the ROPS; the ROPS, cab, seat assembly, and operator's seat platform are secured to one another and/or to the support castings on the isolation mounts by detachable bolts which are provided, enabling a bolted and isolation mounted joint system to be realized; sets of coaxially aligned hinge pins, which are provided in joints forming transversely and fore-and-aft aligned isolation mounts, afford ease of assembly and disassembly of the mounts and also serve as pivot-axis-defining hinges for the ROPS when the tractor overturns and the ROPS strikes the ground; polyurethane bushings which are provided in the isolation mounts isolate the operator's seat platform by interrupting the solid metal path from the rest of tractor, affording an appreciably reduced noise level generated in the platform by vibrations from the rest of the tractor, mainly the moving components and particularly the track chains in a crawler tractor; and a tapered shape is provided on the bushings in the isolation mounts for ease of assembly and disassembly of each of the latter.

Further features, objects, and advantages either are specifically pointed out or will become apparent when, for a better understanding of the invention, reference is made to the following description taken in conjunction with the accompanying drawings, which show a preferred embodiment thereof and in which:

FIG. 1 is a rear elevational view of a crawler tractor embodying a seat platform mounting in accordance with the present invention;

FIG. 2 is a top plan view of the platform, as taken along the line II — II appearing in FIG. 1;

FIGS. 3 and 4, taken along the respective section lines III — III and IV — IV appearing in FIG. 2, are cross-sectional elevational showings of the platform and support as viewed from the front and rear, respectively; and FIG. 5 is a cross-sectional view in side elevation of a supporting isolation mount for the platform, as taken along the section line V — V appearing in FIG. 4.

In the rear view thereof as particularly seen in FIG. 1 of the drawings, a crawler tractor 10 is shown having generally rectangular chassis frame means 12 of which the center line is indicated at 13. The chassis frame means 12 supports, among other things, a platform support 14 and is supported by oscillating suspension means, not shown, on left and right crawler track frame assemblies 16 and 18 disposed one at each side of the tractor. Final drives 20 and 22 operatively interconnect the chassis frame means 12 and the track frame assemblies 16 and 18 to drive the endless tracks as shown on the latter at the same speed in each direction, or at differing speeds in each direction.

An operator's cab 24 has front and rear walls 26 and 28, a roof 30, and left side and right sidewalls 32 and 34, respectively. A platform assembly 36 on the platform support 14 supports the framework of a rollover protective structure (ROPS) 38, and the operator's cab 24 which is open at the bottom. The operator's cab 24 is installed by dropping it vertically in the direction of the arrow 40 so as to enclose the framework of the ROPS 38, and by securing the cab directly to the ROPS by roof connections, not shown, and directly at the cab's base to the platform assembly 36 by means of floor bolts.

A pair of windows 42 in the cab rear wall 28 affords a rear view for the operator in backing. Appearing midway between the windows 42, a cab center line 44 or more technically, the line indicating the longitudinal vertical mid-plane of the cab, is seen as viewed in FIG. 1 to have a left offset L.O. relative to the longitudinal vertical mid-plane or center line 13 of the chassis frame means 12 of the tractor 10. In one physically constructed embodiment of the invention, the amount of left offset L.O. of the cab was 7 inches (18 cm), thus more nearly aligning the operator with, and giving him better visual access to, the left corner of the front mounted tool on the tractor, namely, a bulldozer blade, not shown. Customarily, it is the left end of the blade with which the operator unearths boulders, and does other things requiring one lowered corner of the blade.

A cantileverly protruding right fender 46 adjacent the cab 24 carries a large fuel tank 48, giving better aesthetic balance to the machine and functionally serving to supply the tractor engine, not shown, with fuel. A left fender 50 is between the cab 24 and the left track frame assembly 16.

PLATFORM ASSEMBLY — FIGURE 2

The noted intervening platform support, not shown, supports the platform assembly 36 appearing in this figure and is supported by the chassis frame means generally indicated at 12. The chassis frame means 12 comprises a front frame 52 and a rear main frame 54. The rear main frame 54 has cross members including a front cross member 56 joined in a common casting to a left side rail 58 and a right side rail 60 of the rear main frame.

At its rear, the front frame 52 is secured by bolts, not shown, to the rear frame front cross member 56. The front frame includes cross members, not shown, joined in a fabricated construction to a left frame side rail 62 and a right frame side rail 64. By reason of the left offset of the platform assembly 36, the platform assembly overlies the noted tractor left fender, not shown, and extends cantileverly beyond the respective left frame side rails 62 and 58 of the front and rear chassis frames 52 and 54. The offset of the laterally displaced operator's station was previously designated L.O. in preceding FIG. 1.

The depending left and right sidewalls 32 and 34 of the cab 24 terminate short of the platform assembly 36, but they carry base sealing members, not shown, which elastomerically engage the platform assembly to seal out dust, noise, and the weather elements. The front cab wall 26 carries an integral foot flange 66 turned at 90° relative thereto, and the rear cab wall 28 carries an integral foot flange 68 turned at 90° thereto which respectively are secured flat to the horizontal platform assembly 36 by six floor bolts 70 at the front and by six floor bolts 72 at the rear.

In connection with the framework of the rollover protective structure, not shown, which is inside the cab 24, the foot centers are indicated at 74, 76, 78, and 80 surrounded in each instance by four bolt holes 82 in the platform by which the rollover protective structure is secured in place atop the platform assembly 36.

A reinforcing subassembly of the assembly 36 includes longitudinal floor stiffeners 84 and cross stiffeners 86.

ROLLOVER PROTECTIVE STRUCTURE (ROPS) — FIGURE 3

The framework of the ROPS 38 includes vertically extending structural members defining a forward protective member 88 and a rearward protective member 90 for the left side of the ROPS, and defining a forward protective member 92 and a rearward protective member 94 for the right side. A roof frame of the ROPS includes a left side rail 96 and a right side rail 98 joined by welding to a front roof cross member 100 and a rear roof cross member 102 which structurally tie together the forward protective members 88 and 92 and rearward protective members 90 and 94 all at the top thereof. Gussets 104 at the top are welded in at the angles of the weld joints in customary way.

The ROPS roof frame just described is approximately horizontally coextensive with the roof of the operator's cab, not shown, is in an adjacent plane slightly therebelow, and is secured at the upper sides to the roof of the cab by one rubber mounting at each side in one physically constructed embodiment of the invention.

The platform support 14 according to FIG. 3 comprises a front cross beam 106 and a rear cross beam 108 disposed crosswise across the upper side of the front frame 52 in the chassis frame means 12. The cross beams are liberally flanged castings of deep cross section for sustaining heavy bending loads, and the front cross member 106 adjacent the foot 110 at the right end of the span does not project at the end appreciably beyond the side rail 64 at that side of the chassis frame means 12. Four bolts 112 disposed closely together in one longitudinal row secure the span foot 110 to the side rail 64.

At the opposite side of the chassis frame means 12, four bolts 114 in another longitudinal row similarly secure a span foot 116 of the cross beam 106 to the front frame side rail 62 at that side. But at that side, the cross beam 106 has a cross beam end 118 cantileverly projecting in a side direction appreciably beyond the front frame side rail 62 so as to provide the cab offset noted.

Intermediate the described ends of the cross beam 106, its span carries a hood rear support member 120 which is secured to the front cross member 106 by a set of four bolts 122.

The cross beam end resting on the span foot 110 carries a first isolator 124 including yieldable core means 126 which serves to provide a cushioned, detachable pivot connection 128 with the platform assembly 36 at its right front corner. More particularly in regard to the pivot connection, an upstanding lug at the end of the cross beam includes an apertured knuckle portion 130 confronted by the flat web 132 thereabove of a support casting forming part of the subassembly beneath the platform assembly 36 and constituting a knuckle clevis 134 in the connection. An outer face 136 on the knuckle portion 130 and an inner face 138 confronted by the web 132 extend in opposite directions sideways from a vertical plane containing the fixed horizontal axis of the pivot connection 128 and the foot center 78. It is apparent that the amount of downward slope of the outer face 136 away from the aforesaid vertical plane will establish the angular degrees through which the pivot connection 128 can be rocked laterally outwardly for a side-tilt cab construction if desired. That is to say, the cab, not shown, and/or the framework of the ROPS 36 can be tilted counterclockwise about the noted horizontal axis of the connection 128 as viewed in FIG. 3, through an angle of 90° or more depending upon the formation of the surface of the outer lug face 136 in the matter of confronting the web 132.

The described tilt cab operation will perforce require, beforehand, removal of the fuel tank 48 in FIG. 3, the fender 46, and complete disconnection of a second, or opposite, yieldable isolator 140 forming a similar pivot connection in an overhanging position between the cantilevered end 118 of the cross beam 106 and the platform assembly 36 at its left front corner.

In FIG. 3, a generally vertically extending hand rail 142 for the convenience of the operator is secured at the top and the bottom by bolts to a generally upstanding tower box 144 carried on the platform assembly 36.

Tilting of the cab and/or ROPS in the clockwise direction as viewed in FIG. 3 can take place similarly to the foregoing and is accomplished about the isolator 140 simply by disconnecting the front detachable pivot connection 128 and a so-called fourth pivot connection or isolator, not shown but now to be described.

REAR CROSS MEMBER — FIGURE 4

In this figure, the rear one 108 of the pair of cross members is similar to the front one 106, not shown, except that four cast bosses 146 in the rear beam's span remain undrilled and untapped because, unlike the hood-support-carrying front cross beam, the cross beam 108 carries no such support member or bolts 122, not shown. A similar control rod clearance opening 148 is provided in each cross beam centrally of the beam span but is not utilized in the rear cross beam 108.

The upper and lower edges of the essentially deep beam, cast, heavy section of the beam 108 are suitably reinforced by an integral horizontal upper flange 150 and by integral horizontal lower flanges 152 throughout the end-to-end extent of the rear cross beam 108. A third isolator 154 carried in overhanging relation by one adjacent beam end and a fourth isolator 156 carried by one beam end in a non-overhanging relation relative to the chassis frame means 12 provide the platform support for the platform assembly 36 at its respective left rear and right rear corners.

In the pivot connection formed by the isolator 154, the outer face 136 and inner face 138 of the beam knuckle portion are carefully machined flat in the same horizontal plane with one another and, together with flat the confronting web 132 of the knuckle clevis, are horizontally parallel and define a horizontal gap G of uniform thickness. In one physically constructed embodiment of the invention the gap G was 0.150 inch (0.381 cm). During overturning of the tractor in a counterclockwise direction as view in FIG. 4, the platform assembly 36 would tend to be deflected relative to the tractor in a clockwise direction and also the protective structural member 90 would tend to be deflected into a relative clockwise position as shown by the broken lines 90a in FIG. 4. The resilient isolator 154 would thus allow the gap G to close to the point at which the knuckle face 138 was engaged by the relatively clockwise moving web when it reached the broken line position of the web as shown by the broken lines 132a. After the initial time lag, any further distortion of the ROPS 38 would be met as if the joint had rigidly locked after predetermined initial movement, and the full force of overturning would be reacted as a bending movement at the rear into the cross beam 108 and at the front (by member 88) into the front cross beam, not shown.

At the same time, the opposite upright protective members 94 and 92 would be relatively deflected counterclockwise outwardly as viewed in FIG. 3 with the front member 92 for example taking the broken line position as shown by the broken lines 92a appearing in FIG. 3. During the lost motion movement, the ROPS 38 deforms by bending, and the platform assembly 36 takes a rippled-shape deformation. The idea behind the lost motion, limited pivoting is that the initial crushing force of impact will expend the shock of itself almost immediately and then further deformation can be readily withstood in the path through the isolators into both ends of each cross beam.

Overturning of the vehicle in the opposite direction will close the gap G of FIG. 4 with the web occupying the broken line position 132b, the platform assembly similarly deflecting and occupying the broken line position 36b, the upright protective member occupying the broken line position 90b, and the opposite upright front protective member 92 of FIG. 3 occupying the broken line position 92b.

The amount of lost motion angularity is readily increased or decreased by increasing or decreasing the height of the gaps G of FIGS. 3 and 4 or increasing or decreasing the downward and outward slope of the faces 136 and 138 of the knuckle portion of each beam at each end. The gaps G are located as immediately adjacent the joint hinge axes concerned as practicable, enabling the relatively short gap to afford a ROPS deflection of the order of 7 inches (18 cm) to either side at the ROPS roof level, in one physically constructed embodiment of the invention.

ISOLATOR — FIGURE 5

In this figure, the third isolator 154 by which the protective member 90 of the framework of the ROPS 38 is pivotally connected to an end of the rear cross beam 108 is typical of the other three isolators. The third isolator 154 cooperates to define a common longitudinal horizontal hinge axis 158 with the second isolator 140, not shown. Similarly, the first and fourth isolators namely, the non-overhanging isolators 124 and 156, not shown, at the opposite front and rear corners respectively of the platform assembly together define a mutual longitudinal horizontal hinge axis, not shown.

Each of the vertically extending protective members is provided with, and is welded at 160 to, a foot pedestal 162 carried at the lower end thereof, e.g., at the lower end of member 90, FIG. 5. Each set of four bolt holes 82 in the platform assembly 36 registers with a similar set of flange holes 164 in the associated foot pedestal 162, which pedestal 162 rests flush upon and is secured on top of the platform assembly 36 by four hold down bolts 166.

In the platform assembly 36, the previously referred platform subassembly thereof supports an operator's seat platform 168 and, as noted, the subassembly includes the associated support casting forming the knuckle clevis 134. The clevis 134 includes two, depending, parallel, spaced apart jaws 170 and 172 integral with the flat web 132 and defining axially aligned, outwardly flared trunnion eyes 174 and 176, respectively. Each knuckle clevis 134 also includes four drilled and tapped bolt bosses 178 for the four hold down bolts 166 of each foot pedestal 162. The hold down bolts 166, equipped with individual washers, are each introduced through a registering flange hole 164 and a platform hole 82, and threaded into a tapped boss bore, thus establishing interengagement between pedestals and support castings, and clamping the intervening seat platform 168 firmly in place. As previously noted, the operator's cab, not shown, is removably connected at its roof to the ROPS 38 and removably interengaged at the base of its front and rear walls with the seat platform 168.

The apertured beam knuckle portion 130 at the end of each cross beam tightly accepts and carries a hollow hinge pin 180 which protrudes at its ends from the knuckle portion concentrically with the hinge axis 158 into coextensive reception in the respective trunnion eyes 174 and 176. The core means 126 of each isolator comprises a pair of tapered, elastomeric bushings 182 preferably made of polyurethane plastic. Each bushing complementarily fits within a receiving trunnion eye so as to acoustically insulate each hinge pin 180 from the platform assembly 36 and attendant tractor superstructure.

Threaded nut and bolt elements 184 and intervening washers 186 and 188 clamp the bushings 182 at their large ends so as to socket the latter firmly in the trunnion eyes 174 and 176. An effective spacer is formed by the intervening apertured knuckle portion 130 and two abutting oppositely extending metal sleeves 190 and 192 which separate the hinge pin 180 at each end from the surrounding bushing 182 at that end. The spacer, by reason of direct compression engagement between the outer ends of the respective sleeves 190 and 192 and the washers 186 and 188, limit the precompression on the bushings 182 when the threaded elements 184 are tightened to the predetermined torque specified for pre-loading the joint.

Introduction or removal of the threaded elements 184 with respect to the hollow interior of each hinge pin 180 in an isolator, and the corresponding introduction or removal of the pin 180 from the apertured knuckle portion 130 makes for relative ease and convenience of assembly and disassembly, respectively, of the isolators so as to disconnect the operator's cab from the cross beams of the tractor. Also, preassembly of an isolator, including the knuckle clevis, with each end of each cross beam can be readily accomplished so that the four isolators are in place on the cross beams before the latter are bolted in place on the tractor. Further, the four isolators can be left intact when removing from the tractor the cab, the ROPS, and/or the seat platform 168.

It is apparent that the bushings 182 are so wedged in the outwardly flared trunnion eyes 174 and 176 as to prevent any axial movement of the knuckle clevis 134 relative thereto. The bushings 182 also serve as the bearings yieldably supporting each hinge pin 180 of the isolator. The described taper makes the bushings 182 readily installable in the trunnion eyes and, following installation, the bushings 182 serve the cab as effective yieldable mounts preventing the transmission of vibration and noise, mostly originating in the tracks of the tractor.

The four isolators therefore, in summary, serve as readily detachable joints, pivot connections, isolation mounts, and locking joints which automatically rigidify after predetermined rotational lost motion so as to solidly ground out deflecting forces from overturning following the immediate shock of ground impact.

Variations within the spirit and scope of the invention described are equally comprehended by the foregoing description.

What is claimed is:

1. A mounting assembly on a tractor, comprising:
    chassis frame means;
    a platform support on said frame means, said plaform support including a pair of cross beams disposed crosswise across the upper side of the chassis frame means and mounted on said frame means;
    the crosswise disposition and proportions of the cross beams relative to the chassis frame means being such that at one side of the latter, the cross beams have their ends not projecting appreciably beyond that side of the frame means, whereas at another side the cross beams have their ends cantileverly projecting in a side direction appreciably beyond that other side of the frame means;
    a platform assembly, including assembly end-support castings with individual connections to the respective said ends of the cross beams, and an operator's platform mounted on said end-support castings, so as to be appreciably laterally offset in said side direction relative to the chassis frame means; and
    hinge means in said separate connections forming horizontal pivot joints between the platform assembly and platform support.

2. The invention of claim 1, further comprising:
    a pivoted rollover protective structure on said platform assembly, including an upright framework with depending legs, and foot pedestals carried by said depending legs in contact with the platform assembly, in interengagement with the end-support castings so as to clamp the operator's platform therebetween.

3. The invention of claim 2, characterized by:
    said hinge means forming lost motion, pivot joints affording limited pivoting of the rollover protective structure legs whereafter the joints lock.

4. The invention of claim 1, further comprising:
    an upright operator's pivoted cab on said platform assembly, including depending front and rear and side walls of the cab, and flanges carried by at least some of said walls in contact with said platform assembly, in interengagement with the operator's platform.

5. The invention of claim 4 characterized by:
    said hinge means forming lost motion, pivot joints affording limiting pivoting of the platform assembly whereafter the joints lock.

6. A resilient mounting assembly on a tractor, comprising:
    chassis frame means;
    a platform support on said frame means, said platform support including a pair of cross beams disposed across the upper side of the chassis frame means and mounted crosswise on said frame means so that the beam end project relatively laterally to the latter;
    a platform assembly, including assembly end-support castings mounted on said end of the cross beams, and an operator's platform mounted on said end-support castings; and
    a plurality of yieldable isolators mounted on said platform assembly, each of said isolators including yieldable core means supporting said platform assembly on said platform support, hinge pin means secured to and protruding at its ends from an aforesaid end of the crossbeam of said platform support, and removable threaded clamping elements connected to the yieldable means and clamping same with the core surrounding the protruding ends of the hinge pin means for releasably yieldably journalling the latter in said yieldable core means.

7. The invention of claim 6, further comprising:
    rollover protective structure on said platform assembly, including an upstanding frame with depending legs, and foot pedestals carried by the legs in contact with the platform assembly, connected in interengagement with the end-support castings so as to clamp the operator's platform therebetween.

8. The invention of claim 7, characterized by:
    said yieldable isolators being substantially aligned along, and confined to, the sides of the platform assembly, said hinge pin means, at each side of the latter, being substantially coaxial with one another at that side on a fore and aft pivot joint axis, for affording pivoting of the rollover protective structure legs.

9. The invention of claim 6, further comprising:
    an operator's cubicle on said platform assembly, including an upright cab with depending front and rear and side walls, and flanges at the foot of at least some of said walls connected in interengagement with the operator's platform.

10. A resilient mounting assembly on a tractor comprising:
chassis frame means;
a platform support on said frame means, said platform support including a pair of crossbeams disposed crosswise across the upper side of the chassis frame means and mounted on said frame means;
the crosswise disposition and proportions of the crossbeams relative to the chassis frame means being such that at one side of the latter the cross beams have their ends not projecting appreciably beyond that side of the frame means, whereas at another side the crossbeams have their ends cantileverly projecting in a side direction appreciably beyond that other side of the frame means;
a platform assembly, including assembly end-support castings mounted on said ends of the cross beams, and an operator's platform mounted on said end-support castings, so as to be appreciably laterally offset in said side direction relative to the chassis frame means; and
a plurality of yieldable isolators mounted on said platform assembly, each of said isolators including yieldable core means supporting ther end-support castings of said platform assembly on said platform support, hinge pin means secured to and protruding at its ends from an aforesaid end of the crossbeams of said platform support, and removable threaded clamping elements connected to the yieldable means and clamping same with the core surrounding the protruding ends of the hinge pin means for releasably yieldably journalling the latter in said yieldable core means.

11. The invention of claim 10, characterized by:
said yieldable isolators being substantially aligned along, and confined to, the sides of the operator's platform, said hinge pin means, at each said side of the latter, being substantially coaxial with one another at that side on a fore and aft pivot joint axis.

12. The invention of claim 11, further characterized by:
the yieldable core means each having said pivot joint axis concentric thereto, said yieldable core means comprising an elastomeric bushing having a tapered shape for ease in assembly and disassembly in conjunction with the removable threaded clamping elements.

13. The invention of claim 12, additionally characterized by:
means forming a fixed length spacer between the clamping elements of each isolator and comprising sleeve means which, at the opposite outer ends, intervenes between the bushing core at that end and the corresponding end of the hinge pin means, the spacer in each isolator being engageable by the threaded clamping elements when clamping the bushings in the manner described, to limmit clamping pressure applied to the elastomeric material of the bushings.

14. A resilient mounting assembly for rollover protective structure which includes a plurality of vertically extending structural members defining a forward protective member and a rearward protective member for each side of said structure, and a roof frame comprising a plurality of cross members tying said vertically extending forward protective members together and said rearward protective members together at the top thereof, said protective members carrying foot pedestals, said resilient mounting assembly comprising, in combination with said rollover protective structure:
chassis frame means;
a pair of cross beams disposed across the upper side of the chassis frame means and mounted crosswise on said frame means so that the ends of the cross beams project laterally relative to the latter;
a platform assembly including assembly end-support castings and mounted on said ends of the cross beams;
a plurality of yieldable isolators mounted on said platform assembly, each of said isolators including yieldable core means supporting the end-support castings of said platform assembly on said cross beams, hinge pin means secured to and protruding at its ends from an aforesaid end of the cross beams, and removable threaded clamping elements connected to the yieldable means and clamping same with the core surrounding the protruding ends of the hinge pin means for releaseably yieldably journalling the latter in said yieldable core means;
said yieldable isolators being confined to the respective sides of the chassis frame means, and the hinge pin means therein, at each side, being aligned with one another on a fore and aft hinge joint axis; and
fasteners passing through the platform assembly and securing together the foot pedestals of said structure and the support castings of the platform assembly, clamping the latter therebetween so it will deflect with the rollover protective structure about the hinge joint axes.

15. The invention of claim 14, characterized by:
the beam ends and castings presenting confronting portions immediately adjacent the mutual hinge axis and defining a gap which, following predetermined initial lateral pivotal deflection of a vertical structural member to either side, as occasioned by tractor overturning, closes so as to ground out the remainder of the deflecting force of overturning by reacting same directly from the support castings into the cross beam concerned.

16. In a resilient mounting assembly on a tractor, the subcombination comprising:
a cross beam having a knuckle portion which is at an end of the cross beam and which has lug face means;
an end support casting on said end of the cross beam and forming a knuckle clevis mounted on said knuckle portion, said end-support casting including jaw portions which are interconnected by a web portion and between which the cross beam knuckle portion is received, said web portion and said flat lug face means of the respective casting and cross beam end being in mutually confronting relationship;
a yieldable isolator mounted in the jaw portions on said end-support casting and including yieldable core means supporting said end-support casting on said end of the cross beam, hinge pin means secured to and protruding at its ends from said end of the cross beam and defining a hinge joint axis, and removable threaded clamping elements connected to the yieldable core means and clamping same with the core surrounding the protruding ends of the hinge pin means for yieldably journalling the latter in said yieldable core means.

17. The invention of claim 16, characterized by:

the opposed surfaces of said mutually confronting lug face means and web portion being immediately adjacent, and at opposite sides from, a midplane through the hinge joint axis, and defining a gap which, following predetermined initial forced pivoting on the hinge pin means, in either direction about the hinge joint axis, closes so as to ground out the remainder of the pivoting force by reacting same from the end-support casting directly into the cross beam.

18. The invention of claim 16, wherein said yieldable core means comprises elastomeric bushings received in the casting jaw portions and formed with a tapered shape for ease in the assembly and disassembly thereof with said removable threaded clamping elements.

19. The invention of claim 18, further comprising: means forming a spacer in the isolator comprising sleeve means which, at the opposite outer ends, intervenes between the bushing and the corresponding hinge pin means end so as to limit the threaded clamping elements' engagement with the bushings in the extent to which they compress the latter.

\* \* \* \* \*